June 11, 1963   H. R. UHTENWOLDT   3,093,015
MACHINE TOOL MOTION TRANSMITTING MECHANISM
Filed April 22, 1960
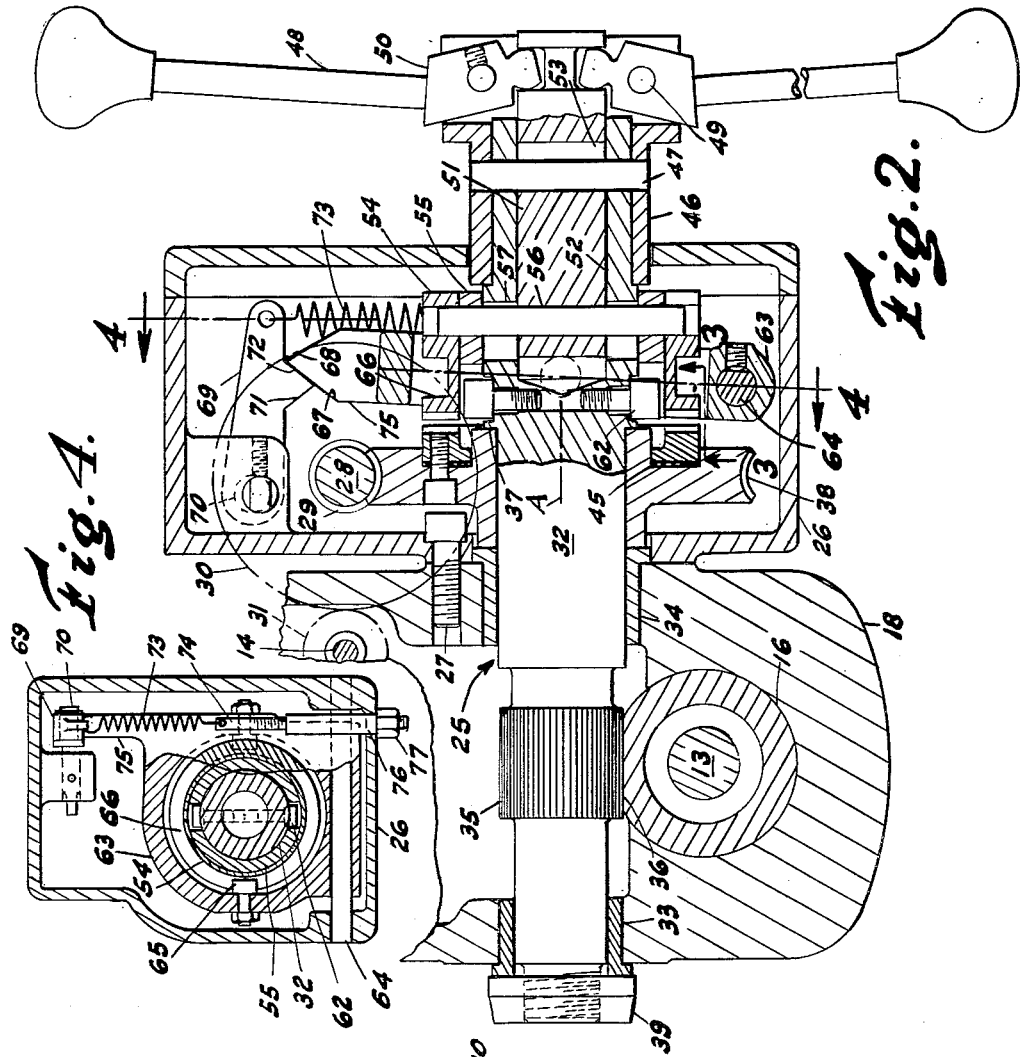
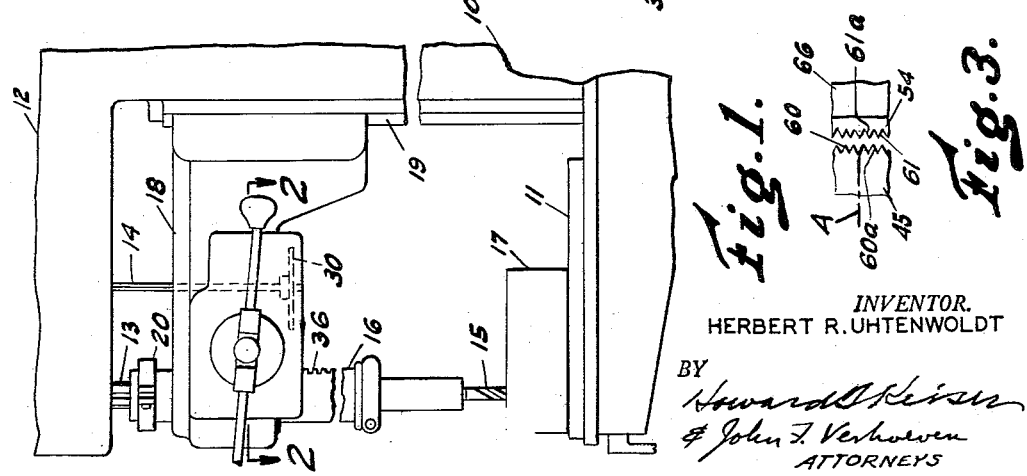
INVENTOR.
HERBERT R. UHTENWOLDT
BY
Howard O Keiser
& John F. Verhoeven
ATTORNEYS United States Patent Office 3,093,015
Patented June 11, 1963

3,093,015
MACHINE TOOL MOTION TRANSMITTING
MECHANISM
Herbert R. Uhtenwoldt, Wilmington, Ohio, assignor to
The Cincinnati Milling Machine Co., Cleveland, Ohio,
a corporation of Ohio
Filed Apr. 22, 1960, Ser. No. 24,001
1 Claim. (Cl. 77—32.7)

The present invention relates to a machine tool motion transmitting mechanism particularly suitable for the power feed system in a machine such as a drilling machine where, in many applications, the advance of the tool must be stopped at a precise position.

In many machine tool applications it is desirable to advance a member under controlled power to a precise predetermined position and stop the advancing member at that position without coasting or overrun. For example, in drilling a blind hole in a workpiece it is common to provide a positive stop to prevent advance of the tool beyond the desired depth, and it is desirable to maintain the power advance until the positive stop is engaged. In the present invention there is provided a mechanism with which the tool can be advanced through a positive acting gear coupling until engagement with a positive stop is effected, at which time the coupling is automatically disengaged to disconnect the tool from the source of feed power.

In the preferred form of the present invention, the motion transmitting mechanism between the source of feed power and the quill which carries the tool has a gear coupling comprising a pair of gear members which are engaged to effect advance of the quill and hence the tool. One of the gear members is shiftable between the engaged and a disengaged position relative to the other gear of the coupling and the two gear members, when engaged, have a tendency to separate when there is relative torque between the gears, the separating force increasing as the relative torque increases. A predetermined force is applied through a detent to hold the shiftable gear in either the engaged or disengaged position and this force is sufficiently great to hold the shiftable gear engaged with the other gear when feeding power is transmitted through the coupling to advance the tool in the work. However, when the advance of the quill is arrested by a positive stop, the relative torque between the gears increases. This increases the separting force between the gears to overcome the predetermined holding force exerted through the detent and the shiftable gear moves to its disengaged position, disconnecting the feed power source from the quill. Thus, with the mechanism of the present invention, the tool is power fed through positive acting gears to a predetermined position defined by the stop, and the feed power source is disengaged from the tool when the tool is at this position, and not before, without danger of damage to the feed mechanism.

It is therefore an object of the present invention to provide an improved machine tool motion transmitting mechanism operable to positively advance a member under power until a stop is engaged.

It is another object of the present invention to provide an improved machine tool motion transmitting mechanism operable in response to increased torque between gears thereof to effect disengagement from a source of power.

It is yet another object of the present invention to provide an improved positive acting, automatically disengaging feed mechanism for a drilling machine.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:
FIG. 1 is a fragmentary view in elevation of a drilling machine incorporating the present invention;
FIG. 2 is a section taken along line 2—2 of FIG. 1;
FIG. 3 is a view taken along line 3—3 of FIG. 2; and
FIG. 4 is a view, partly in cross-section, taken on line 4—4 of FIG. 2.

There is shown in FIG. 1 a drilling machine having an upstanding column 10, a workpiece supporting table 11 mounted on the column, and a horizontally extending overarm 12 on top of the column which receives the vertically oriented spindle 13 and a shaft 14 parallel thereto. The spindle 13 and shaft 14 are splined in a transmission (not shown) in the overarm 12 driven by a motor (not shown) mounted on the back of the column 10 for rotation of the spindle 13 and shaft 14. The spindle has a drill tool 15 received in its lower end and the spindle is rotatably mounted in a quill 16 in a conventional manner for longitudinal movement therewith to advance and retract the rotating tool 15 relative to a workpiece 17 mounted on the table 11. A head 18 is clamped to vertical ways 19 on the column 10 for vertical adjustment, and the shaft 14 is journaled therein. The quill 16 is nonrotatably but slidably received in the head 18, for longitudinal movement relative thereto, and extends therethrough. A collar 20 is clamped on the quill at a selected longitudinal position above the head 18 and defines a positive stop, the collar engaging the top of head 18 to stop the downward movement of the quill at a selected position, thereby stopping the advance of the rotating tool 15 at a selected depth in the workpiece 17.

Motion transmitting mechanism, indicated generally at 25, extends between the shaft 14, which continuously rotates in a predetermined direction during the operating cycle and may be considered the source of feed power, and the quill 16 to lower the quill and advance the rotating tool 15 into the work at a controlled rate. A housing 26 is connected to the side of head 18, by bolts 27, and has a shaft 28 with a worm 29, journaled therein. At its lower end shaft 28 has a gear 30 carried thereon engaged with a gear 31 carried by shaft 14, the head 18 and housing 26 having suitable openings at the gears. Thus the worm 29 is continuously rotated in a predetermined direction during the operating cycle.

A shaft 32, having a longitudinal axis A, is journaled in bushings 33 and 34 mounted in the head 18 and has a gear 35 integral therewith engaging rack 36 on the quill whereby the quill is moved longitudinally by rotation of shaft 32. Shaft 32 extends through housing 26 and has a shoulder 37 thereon spaced from the head bushing 34. A worm wheel 38 is received on shaft 32 between bushing 34 and shoulder 37, and a nut 39 is threadedly received on the end of the shaft on the other side of the opposite head bushing 33 to prevent axial movement of shaft 32 but to permit rotation thereof and rotation of worm wheel 38.

The worm wheel 38 has a ring gear 45 mounted in one face thereof and the worm wheel is loosely received on shaft 32 for rotation thereof, and hence rotation of gear member 45, relative to shaft 32. The worm wheel is continuously engaged with worm 28 and hence the gear 45, which may be designated as a drive gear, is continuously rotated, about the axis A, during the operating cycle.

The shaft 32 has a hub 46 secured thereto by pin 47, the hub extending outside the housing 26. A pair of handles 48 have pins 49 journaled in the hub 46, the pins having lugs 50 secured thereto. The lugs 50 engage a plunger 51 slidably received in a bore 52 in the end of shaft 32 and the plunger 51, which is shown in its extreme right hand position in bore 52 in FIG. 2, is shifted axially to the left within the bore as the handles are swung to the right, as viewed in FIG. 2, about their fulcrums defined by the pins 49. The pin 47, which is snugly received in hub 46 and shaft 32, is received in a longitudinally extending slot 53 in the plunger whereby the plunger may be shifted within the bore 52 relative to the shaft 32 and hub 46.

Beyond the inner end of hub 46, a gear member 54 (which may be designated as a driven gear), and the mounting ring 55 therefor, are slidably received on shaft 32. A pin 56 is snugly received in gear member 54, mounting ring 55, and plunger 51, and extends through a longitudinally extending slot 57 in shaft 32. A pair of antifriction rollers 62 mounted in shaft 32 extend into slots in ring 55 so that the gear member 54 is operatively connected to shaft 32 for rotation therewith, about axis A, but is movable longitudinally relative to shaft 32 with the plunger 51.

The gear member 54 and gear member 45 define a gear coupling, the gear member 45 having annular teeth 60 on one face thereof and the gear member 54 having annular teeth 61 on one face thereof facing the teeth 60. The gear member 54 is shiftable on shaft 32 between a disengaged position (as shown in FIG. 2) relative to gear member 45, which does not shift longitudinally on shaft 32, and an engaged position relative thereto with the teeth 60 and 61 engaged. As shown in FIG. 3, when gear member 45 is driven in a direction to advance the tool into the work (counterclockwise as viewed from the handle end of shaft 32), and the gear members are engaged, power is transmitted through drive faces 60a of teeth 60 and driven faces 61a of teeth 61. These engaging faces are inclined relative to the axis A of shaft 32 and the gears so that the rotating drive gear 45 produces, on driven gear 54, a force which may be resolved into a driving force acting in a plane normal to shaft 32 and an axial separating force acting parallel to shaft 32, these forces increasing as the relative torque between the gear members is increased.

A latching collar 63 is received around shaft 32 and gear member 54 and (as shown in FIG. 4) is mounted on a shaft 64 journaled in the front of the housing 26. The collar 63 has inwardly extending members 65 which engage an annular external groove 66 in gear member 54, whereby the collar pivots about shaft 64 as the gear member shifts axially on shaft 32. The collar 63 has opposite its pivotal connection defined by shaft 64, a portion 75 which has oppositely sloping cam surfaces 67 and 68. A detent 69 is pivotally connected, at 70, to the housing 26 and has oppositely sloping cam surfaces 71 and 72. The detent 69 is normally biased to a holding position (shown in FIG. 2) by spring 73 and, in this position, will hold the gear member 54 in either the disengaged position, with surface 67 of the collar engaged with surface 72 of the detent, or the engaged position, with surface 68 of the collar engaged with surface 71 of the detent. The spring 73 is connected to a rod 74 loosely received in sleeve 76 mounted in the housing 26, the rod 74 extending outside the housing for adjustment of the tension in the spring 73 by nut 77, and hence adjustment of the holding force exerted on gear member 54 through detent 69 and collar 63 by the spring. Since the engaging surfaces on collar 63 and detent 69 are inclined, the detent will be cammed out of its holding position, permitting shifting of the gear member 54 between the engaged and disengaged position, by a sufficient force applied axially to gear member 54 to overcome the holding force on said gear member exerted through detent 69 and collar 63 by the spring 73.

In operation, if the gear members 45 and 54 are disengaged, the power feed movement of the quill toward the workpiece, and hence feeding movement of the spindle and tool, is begun by swinging handles 48 to the right as viewed in FIG. 2. This shifts the plunger 51 inwardly in bore 52. Sufficient force is applied by the operator to gear member 54 through handles 48, plunger 51, and pin 56 to shift gear member 54 into the engaged position, the collar 63 momentarily camming the detent out of the holding position. As gear teeth 61 engage with gear teeth 60 the detent is urged back to its holding position, with detent shoulder 71 engaged with collar shoulder 68, by spring 73. Nut 77 is adjusted so that a holding force is exerted on gear member 54, holding that gear member engaged with gear member 45, which is equal and opposite to a predetermined separating force between the gear members 54 and 45 in excess of the separating force developed by the transmission of power required to advance the tool into the work, Thus, as the tool is advanced into the work, gear member 54 is held in the engaged position and feeding power is transmitted from shaft 14, through shaft 28, worm wheel 38 and gear member 45, gear member 54, ring 55, rollers 62, and shaft 32 to quill 16.

The collar 20 is initially positioned on quill 16 to engage head 18 when the tool 15 reaches the desired depth in the workpiece 17. When this occurs quill 16 stops its downward movement and rotation of shaft 32, which is engaged with the quill through gear 35, is stopped. This stops rotation of gear member 54, but since drive gear 45 continues to rotate, the relative torque between the gear members immediately builds up, increasing the separating force between the gear members. When the separating force exerted by gear member 45 on gear member 54 exceeds the oppositely acting holding force exerted on gear member 54 by spring 73 acting through detent 69 and collar 63, the detent is momentarily cammed out of its holding position, and the gear member 54 is shifted to the disengaged position, thereby disconnecting the shaft 32 and quill 16 from the source of feed power. As the gear member 54 reaches its disengaged position the detent returns to its normal holding position to hold the gear member in that position. The handles 48 swing back to the position shown in FIG. 2 as gear member 54 shifts to its disengaged position and thereafter the tool can be retracted from the work by reversely rotating shaft 32 with these handles.

What is claimed is:

In a machine tool having a source of power and a cutting tool, the combination of a housing, a shaft journaled in the housing operable when rotated to feed the tool into a workpiece, a drive gear operatively connected to the source of power and received on said shaft for rotation relative thereto, said drive gear having teeth on one face thereof, a driven gear received on the shaft, antifriction rollers connecting the driven gear to the shaft for rotation with the shaft and axial movement relative thereto, said driven gear having teeth on one face thereof facing the teeth on said drive gear, the teeth of said gears having engaging faces inclined relative to the axis of the shaft to produce an axial separating force between the gears when the gears are engaged and subjected to a relative torque therebetween, said separating force increasing as said torque increases, said driven gears shiftable axially on said shaft relative to the drive gear between an engaged and disengaged position, means to stop advance of the tool at a predetermined position and thereby stop rotation of the shaft when said driven gear is in the engaged position to produce a separating force between the teeth of the gears in excess of a predetermined separating force, a detent having a pair of oppositely sloping cam surfaces and having a spring connected thereto, means to adjust said spring to produce a predetermined biasing force normally to urge the detent into a holding position, a latching collar encircling the shaft and engaged with the driven gear, said collar pivotally connected at one side to the housing and having a pair of oppositely sloping cam surfaces on the opposite side adapted to engage the detent cam surfaces normally to hold the driven gear in one of said positions, said collar camming the detent out of its holding position against the bias of the spring for shifting of the driven gear from the engaged to the disengaged position when the separating force between the gears exceeds said predetermined separating force, a hub secured on said shaft, a plunger slidably received in said shaft, said plunger connected to the driven gear on the shaft, a handle pivotally connected to the hub and engaged with the plunger, said handle operable to rotate the hub to effect manual rotation of the shaft and movement of the tool when the driven gear is disengaged from the drive gear, said handle pivotal in one direction in the hub to shift the plunger and cam the detent out of its holding position to effect shifting of the driven gear from the disengaged to the engaged position, said handle pivoted in the opposite direction in the hub by the driven gear when the driven gear is shifted to the disengaged position in response to a separating force in excess of said predetermined separating force.

References Cited in the file of this patent
UNITED STATES PATENTS

| | | |
|---|---|---|
| 1,433,387 | Leckinger | Oct. 24, 1922 |
| 1,727,607 | Klausmeyer | Sept. 10, 1929 |
| 2,033,484 | Schauer et al. | Mar. 10, 1936 |
| 2,422,495 | Morrow | June 17, 1947 |
| 2,560,238 | Nouzak | July 10, 1951 |